(12) United States Patent
Hong et al.

(10) Patent No.: US 6,590,579 B1
(45) Date of Patent: Jul. 8, 2003

(54) SYSTEM FOR LOW MISS RATE REPLACEMENT OF TEXTURE CACHE LINES

(75) Inventors: Zhou Hong, Cupertino, CA (US); Konstantine Iourcha, San Jose, CA (US); Lin Chen, Fremont, CA (US)

(73) Assignee: S3 Graphics Co., Ltd., Grand Cayman (KN)

( * ) Notice: Subject to any disclaimer, the term of this patent is extended or adjusted under 35 U.S.C. 154(b) by 381 days.

(21) Appl. No.: 09/664,988

(22) Filed: Sep. 18, 2000

(51) Int. Cl.[7] .............................. G06T 11/40
(52) U.S. Cl. .................. 345/552; 345/557; 345/582; 345/559; 711/136
(58) Field of Search ................. 345/552, 557, 345/501, 559, 536, 582; 711/133, 134, 135, 136, 118, 128

(56) References Cited

U.S. PATENT DOCUMENTS 5,828,382 A * 10/1998 Wilde .................. 345/552
6,233,647 B1 * 5/2001 Bentz et al. ............. 345/557
6,295,068 B1 * 9/2001 Peddada et al. .......... 345/582
6,490,652 B1 * 12/2002 Van Hook et al. ......... 711/118

OTHER PUBLICATIONS

Lance Williams, "Pyramidal Parametrics," Proceedings of SIGGRAPH '83, Computer Graphics, vol. 17, No. 3, Jul. 1983, pp. 1–11.

* cited by examiner

Primary Examiner—Kee M. Tung
(74) Attorney, Agent, or Firm—Carr & Ferrell LLP

(57) ABSTRACT

A system and method is provided for mipmap texturing in which texture tiles are mapped into sets of a set-associative texture cache for use in displaying a graphic primitive. When a miss occurs, a new texture tile is called from main memory to replace a texture tile which is not shared between the segment being traversed and the next segment to be traversed and which is the "least recently used". This is accomplished by maintaining a record for each cache line describing the texture tile it contains and replacing the texture tile which is the "least likely to be reused".

11 Claims, 4 Drawing Sheets

SYSTEM FOR LOW MISS RATE REPLACEMENT OF TEXTURE CACHE LINES

TECHNICAL FIELD

The present invention relates generally to texture mapping in graphics systems, and more particularly to texture cache controllers.

BACKGROUND ART

Texture mapping is a powerful technique for adding realism to a computer-generated scene. In its basic form, texture mapping places an image of an object's texture onto an object in a scene. Because texture mapping is so useful, it is provided as a standard rendering technique both in graphics software interfaces and in computer graphics hardware.

When mapping a texture image onto an object, the color of the object at each picture element, or pixel, is modified by a corresponding color from the image. In general, obtaining this color from the image conceptually requires several steps. The image is normally stored as a sample array, so a continuous image must first be reconstructed from the samples. Next, the image must be warped to match any distortion (such as caused by perspective) in the projected object being displayed. Then, this warped image is filtered to remove high-frequency components that would lead to aliasing in the final step and resampled to obtain the resulting color to apply to the pixel being textured.

In practice, the required pre-filtering is approximated by one of the several methods. One of the most popular is mipmapping (from MIP, multium in pravo, many things in a small space). See L. Williams, "Pyramidal Parametrics", Proceedings of SIGGRAPH '83, Computer Graphics, vol. 17, no. 3, July 1983, pp. 1–11.

In basic texture mapping, a texture image is applied to a polygon, such as a triangle, which is called a "primitive". The pixel locations of the primitive in the screen space are given with orthogonal indices X and Y for the screen space coordinates. The polygon is rendered based on the geometry of the polygon, the translation, distortion, and rotation of the polygon in the scene being rendered, lighting conditions, and information about the appearance of the polygon.

A map of values with orthogonal indices U and V for the texture space coordinates specifies information about the texture of the polygon. The texture image, or "texture tile", is made up of texture elements, or "texels," which are analogous to the pixels of the image of the polygon being rendered in the screen space. The texture tile is mapped to the polygon such that the polygon appears to have the texture tile attached to it, like wallpaper on a wall. This is accomplished by assigning texture coordinates (U,V) to the vertices of the polygon.

As a polygon undergoes translations, distortions and rotations relative to the scene, the size, shape and orientation of the texture information attached to the polygon may be changed or resized. Because the scale of the projection of a texture map to the screen space varies as the polygon moves in the scene, it is conventional to use maps of varying levels of detail in place of a single texture map. These maps are called "mipmaps" and they allow the mapping of texture map texels to screen space pixels to be carried out efficiently. In typical mipmaps, a hierarchy of maps is constructed, based on one full resolution map. The full resolution map constitutes the lowest mipmap level map. Each higher mipmap level contains a map in which the texels each represent a proportional texel region in the map one mipmap level lower. The highest mipmap level map typically contains only one texel.

The polygon locations and mipmaps are stored in a memory, such as the main memory of the computer, but a cache is placed operationally between the main memory and the graphics processor in such systems. The caching technique is beneficial because processors, including graphics co-processors, frequently cluster their references in time and space to blocks of all data stored. When the blocks are stored locally, the access times are drastically reduced which speeds up the overall operation of the system over a system which must always access main memory.

The basic problem with caching involves establishing an efficient technique for allocating cache spatial and temporal resources. When the block of data required is found in the cache, it is a "hit" and a copy of the requested data is sent to the processor. When the block of data is not found, it is a "miss" and the requested data is read from the larger, slower main memory and transferred both to the cache and to the processor. When the block of data from the miss is added to the cache, it replaces a block of data already in the cache.

There are a number of replacement strategies which are well known, but the most universally used is the "least recently used" (LRU) strategy where the least recently used block of data is replaced in the cache. Unfortunately, it sometimes replaces the block of data which will be needed next, and this will cause a subsequent miss which will slow down the texturing process.

With the importance of speed in order to obtain fast, real-time 3D graphics, a better system for cache replacement of texture tiles has been long sought but has eluded those skilled in the art.

DISCLOSURE OF THE INVENTION

The present invention provides a system and method of faster mipmap texturing in which texture tiles are replaced in a set-associative texture cache. When a miss occurs, a new texture tile is called from main memory to replace a texture tile which is not shared between the traversal segment (the segment being traversed) and the next segment to be traversed and which is the least recently used. This is accomplished by maintaining a record for each cache line describing the texture tile it contains. The record specifies at least if: the current traversal segment is using the texture tile; the texture tile touches the right edge of the current traversal segment; the texture tile touches the bottom edge of the current traversal segment; or the texture tile has been the least recently accessed.

The present invention provides a cache data replacement process which inventors have named a "least likely to be reused" (LLR) method.

The present invention provides a cache line replacement strategy which combines the LLR method with other methods.

The present invention has the advantage of reducing the miss rate of the texture cache over other methods by taking advantage of spatial dependency.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
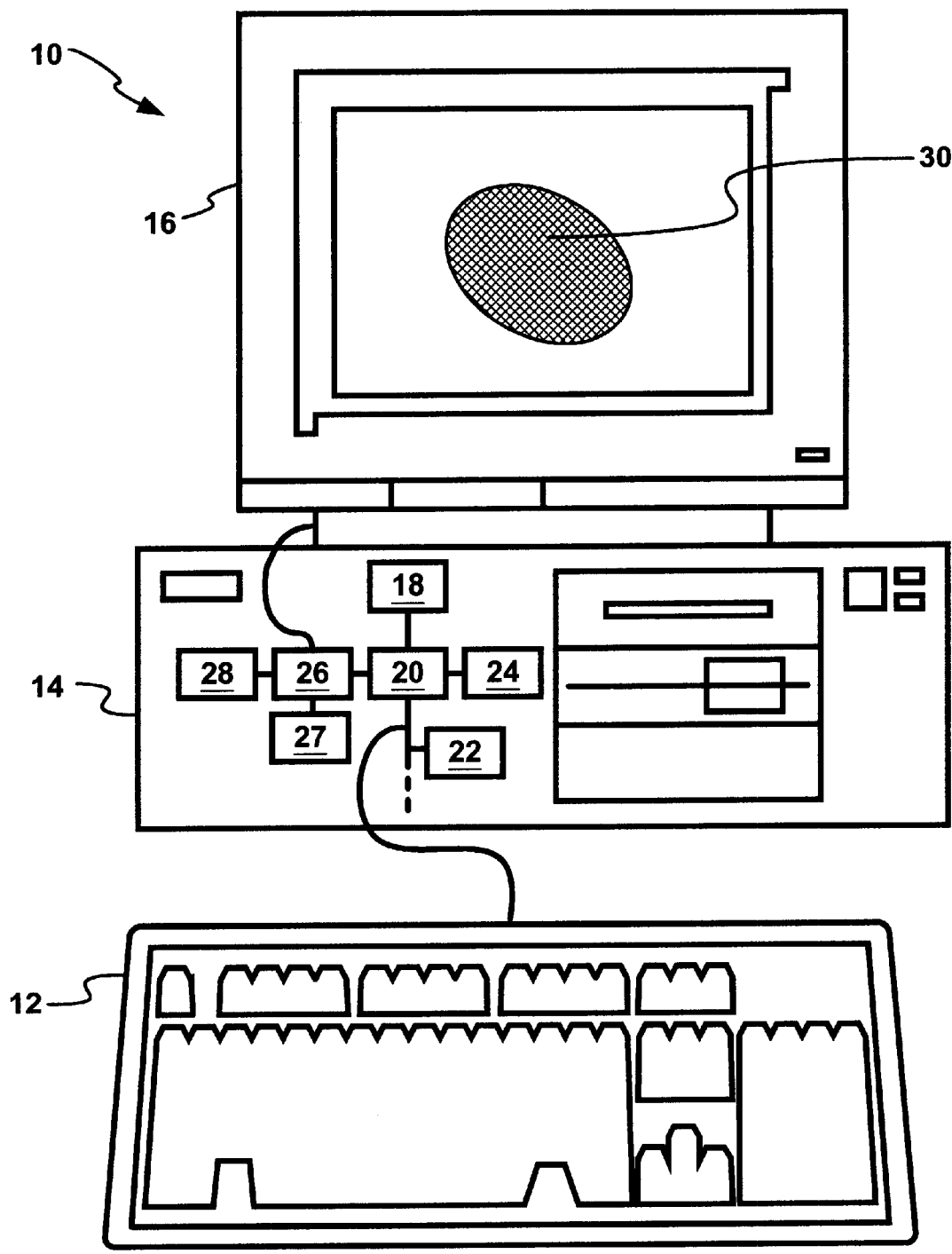
FIG. 1 is a computer system incorporating the present invention.

Referring now to FIG. 1, therein is shown a computer system 10 consisting of an input keyboard 12, a computer 14, and an output display 16. The computer 14 contains all the conventional components for operation of the computer system 10, including a central processing unit (CPU) 18. The CPU 18 performs most of the computation operations of the computer except those related to the output display 16. The CPU 18 is connected to a north bridge chip 20, which in turn is connected to a south bridge chip 22. The north bridge chip 20 is further connected to a memory 24 and a graphics chip 26. The north bridge chip 20 contains the communications related circuitry and the south bridge chip 22 contains the peripheral components related circuitry.

The graphics chip 26 could have a separate memory 27 in some embodiments, but in others the memory 24 would be used in place of the separate memory 27 for storing graphics output.

The graphics chip 26 is a graphics co-processor which performs the calculations necessary for high quality, high-speed graphics output such as used in 3-D games. The graphics chip 26 includes a texture cache 28, which is also operatively associated with the memory 24 and/or 27. The graphics chip 26 is connected to provide an output to the output display 16.

It will be understood by those skilled in the art, that other embodiments could have the functions of the graphics chip 26, the north bridge chip 20, and the south bridge chip 26 integrated with the CPU 18 and the texture cache 28 operatively associated with local random access memory and also integrated with other circuitry.

On the output display 16 is shown a textured object 30.

Figure 2:
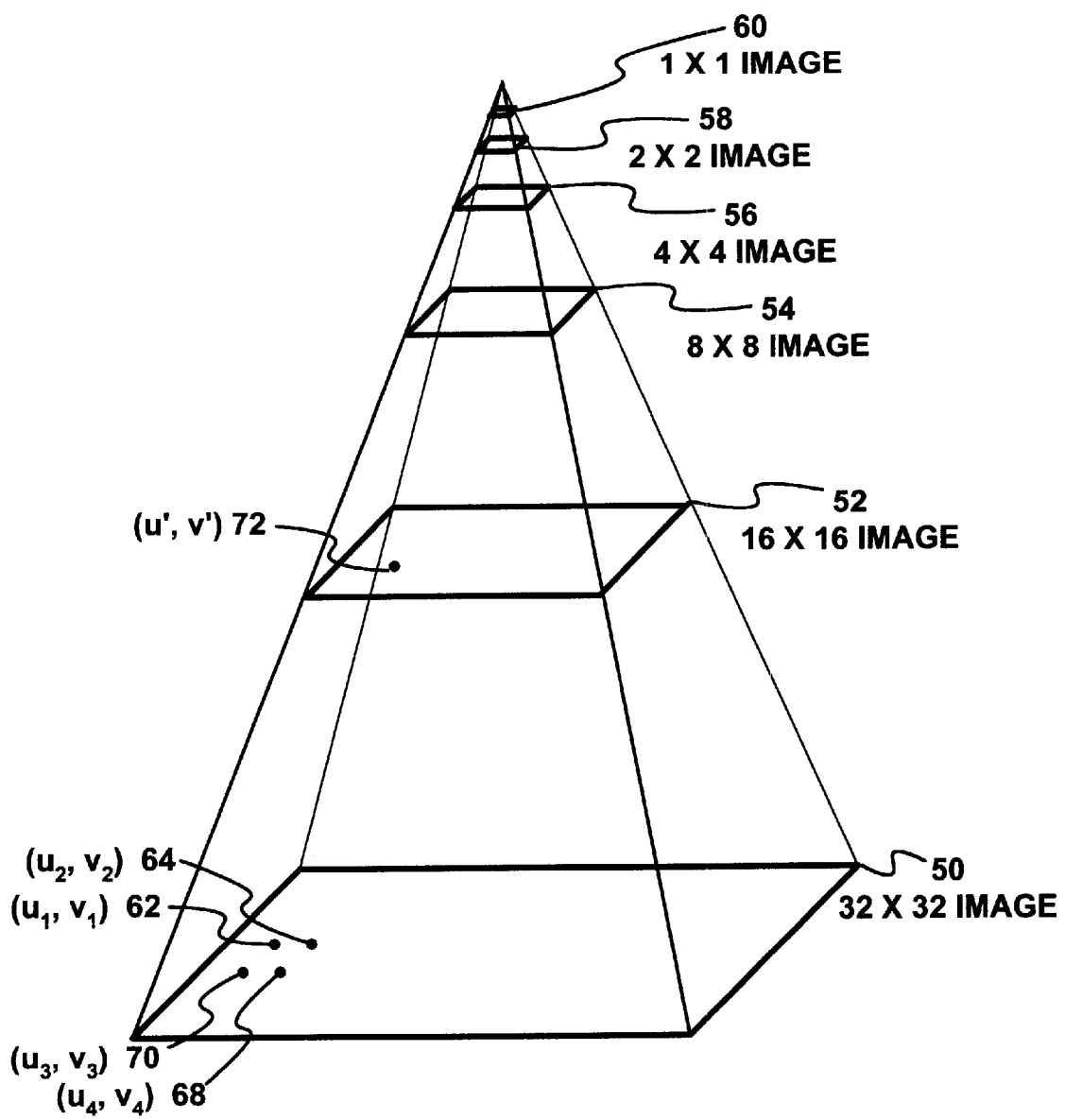
FIG. 2 (PRIOR ART) is an illustration of the mipmap format of texture maps.

Referring now to FIG. 2 (PRIOR ART), therein is shown an example of a mipmap in which a texture is stored as a series of recursively filtered images with each image being one-quarter the size of the previous image. Each of the various images is referred to as a "mipmap level of detail" of the mipmap. The highest detail is shown as a 32 by 32 texel image 50. The less detailed images are a 16 by 16 image 52, an 8 by 8 image 54, a 4 by 4 image 56, a 2 by 2 image 58, and a 1 by 1 image 60.

The texture coordinate system is designated by U and V, and the mipmap level of detail being referred to is D with 0 (zero) being the 32 by 32 image 50, 1 (one) being the 16 by 16 image 52, 2 (two) being the 8 by 8 image 54, 3 (three) being the 4 by 4 image 56, 4 (four) being the 2 by 2 image 58, and 5 (five) being the 1 by 1 image 60. For each corresponding mipmap level of detail, D, four pixels on an image are four by four box filtered to form one pixel on the next smaller image. Thus, texel $(u_1, v_1)$ 62, texel $(u_2, v_2)$ 64, texel $(u_3, v_3)$ 70, and texel $(u_4, v_4)$ 68 on the 32 by 32 image 50 would be box filtered to form the pixel $(u', v')$ 72 on the 16 by 16 image 52. Similarly, four texels on the 16 by 16 image 52 would be box filtered to form a texel on the 8 by 8 image 54. This would be repeated to form the texels for the 2 by 2 image 58 and the 1 by 1 image 60. As evident to those skilled in the art, other filters can be used, such as bi-linear, bi-cubic, etc., and they can take more than four pixels as an input.

Figure 3:
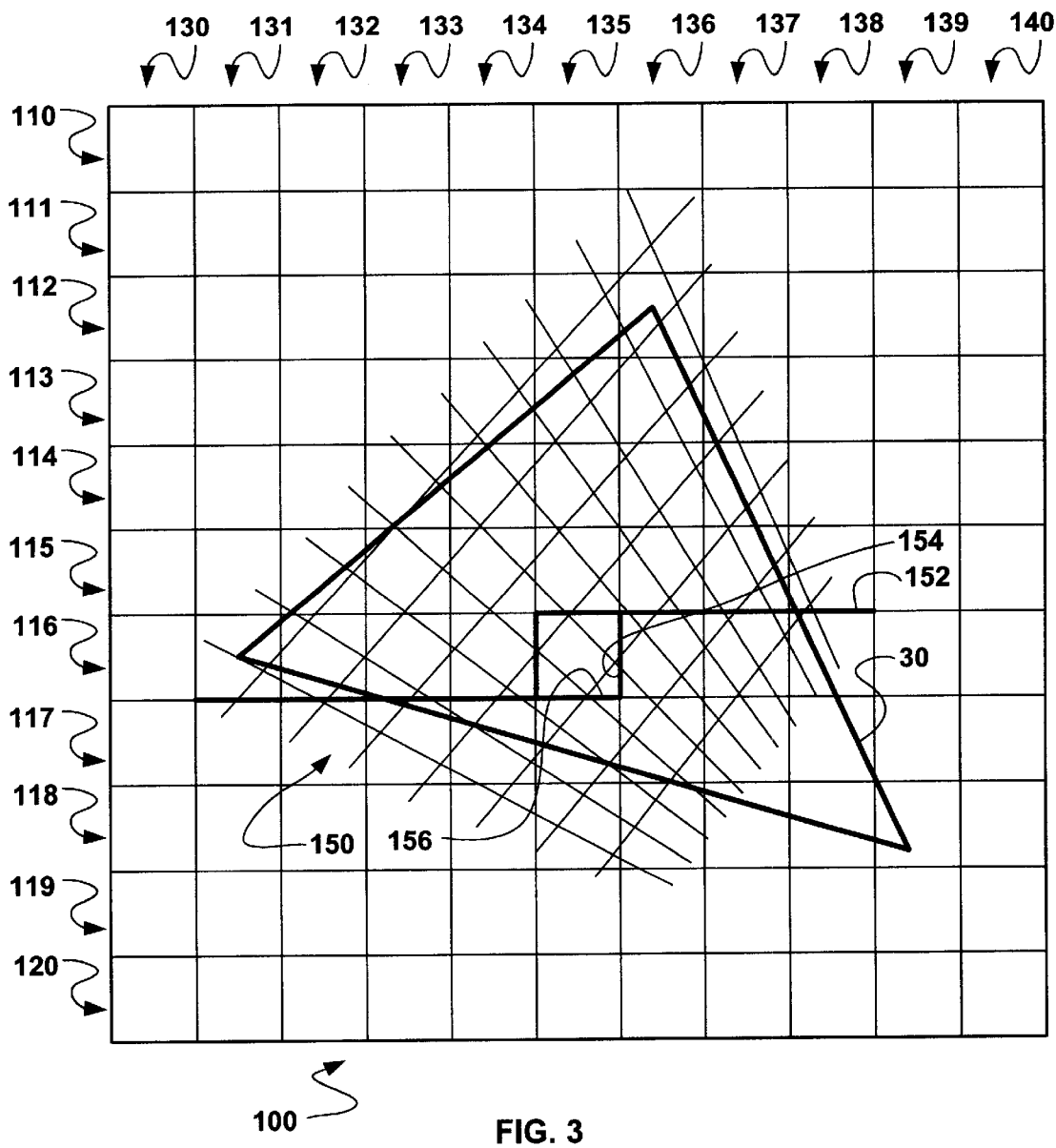
FIG. 3 is an illustration of texels from a texture cache being mipmapped on to a primitive.

Referring now to FIG. 3, therein is shown a portion 100 of the output which may be an output in an output buffer or on the output display 16 in the best mode. The output display 16 has a plurality of horizontal, X-axis, traversal bands 110 through 120 and vertical, Y-axis, columns 130 through 140. At the intersection of a band and a column is a segment. The segments are designated by their band and column intersection such that the first segment on the top left is designated as segment 110–130 and the last segment on the bottom right is designated as segment 120–140.

In the best mode, the traversal of the segments on the output display 16 is from segments on the left to those on the right (X-axis movement) and from segments on the top to those on the bottom (Y-axis movement). Within a segment, the traverse path is also from left to right and top to bottom. Thus, the top traverse line 152 of the band 115 is between the band 115 and band 116. In a segment itself, such as the segment 116–135, the right edge 154 is between segment 116–135 and segment 116–136 and the bottom edge 156 is between segment 116–134 and segment 117–134.

As would be evident to those skilled in the art, the traversal sequence could be in any order and still be within the scope of the present invention.

Also shown on the portion 100 of the output display 16 is the triangle primitive 30 having a portion of a texture co-ordinate system 150 superimposed thereon. The U and V axes are determined as appropriate by the graphics chip 26.

Figure 4:
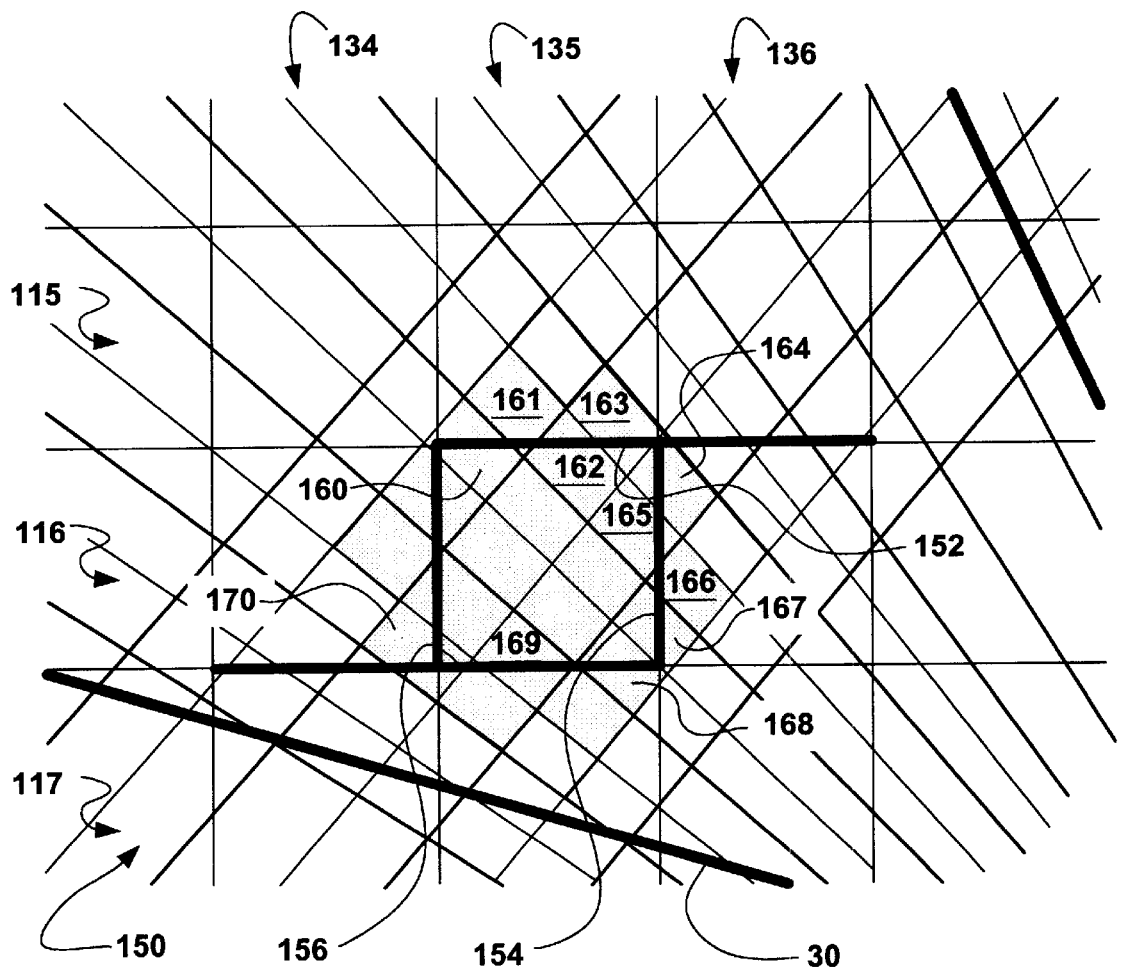
FIG. 4 is a close-up of a portion of FIG. 3.

Referring now to FIG. 4, therein is shown a close-up of the primitive 30 and the texture co-ordinate system 150 in the area of the segment 116–135. All the texture tiles contiguous with the segment 116–135 are shown shaded. Along the top traverse line 152 of the band 115 are a plurality of texture tiles 160 through 164. Along the right edge 154 of the segment 116–135 are a plurality of texture tiles 164 through 167. And, along the bottom edge 156 of the segment 116–135 are a plurality of texture tiles 168 through 170.

Figure 5:
FIG. 5 is an example of a set of registers carrying out the present invention.

Referring now to FIG. 5, therein is shown a state register 200 for a cache line holding one texture tile. The state register 200 is in a cache controller (not shown) and has a plurality of entry fields. In the preferred embodiment, the first entry 201 is a one-bit field right which specifies if the texture tile touches the right edge of the current segment. The second entry 202 is a one-bit field current which specifies if the current segment is using the texture tile. The third entry 203 is a one-bit field bottom which specifies if the texture tile touches the bottom edge of the current segment. The fourth entry 204 is a two-bit field age (assuming a four-way set associative cache, if cache has a different number of ways, the field should be sized accordingly) which specifies the access sequence to the lines of the set for least recently used process purposes. The above discloses the state register 200 of which the inventors have named a portion to be a "least likely to be reused" (LLR) state register for implementing what the inventors have named a "least likely to be reused" (LLR) cache line replacement process.

In operation, the computer system 10 shows a computer graphic by use of the input keyboard 12 which causes the north bridge chip 20 to access the graphics chip 26. The graphics chip 26 determines the location of the primitive 30 and determines the appropriate mipmap level of detail of the texture mipmap 52, 54, 56, 58, or 60 which is required to fill the primitive 30 with a desired texture.

Conceptually in the best mode for example, as the traverse along the x-axis is made from left to right, the right texture tiles 164 and 167 of the segment 116–135 are the most likely to be reused as left texture tiles 164 and 167 in the next subsequent segment 116–136. Thus, while the right texture tiles 164 and 167 are retained, the other texture tiles can be replaced first based on the least likely to be reused process and second based on the least recently used process when these texture tiles are equally likely to be reused. As the traverse along the y-axis is made from top to bottom, the bottom texture tiles 168 and 169 of the segment 116–135 are the most likely to be reused as top texture tiles 168 and 169 in the next subsequent segment 117–135. Thus, while the bottom texture tiles 168 and 169 are retained, the other texture tiles can be replaced first based on the least likely to be reused process and second based on the least recently used process when these texture tiles are equally likely to be reused.

There are two classes of events which affect the cache controller state. The first consists of texture requests which might result in "hit" or "miss" events. The second are explicit control signals consisting of a "reset" and two signals generated by the traverse logic "X-Move" and "Y-Move". The latter signals are appropriately synchronized with the stream of texture requests and used to determine the least recently used (LRU) texture tiles in the cache.

The cache operates on the basis of:

1. On "reset":
   a. For all cache lines of the cache, set bits in LLR state registers:
      current=bottom=right=0
   b. For all sets of the cache, assign sequential numbers (starting from zero) to the age field of the LLR registers corresponding to the cache lines of the set (to initialize the LRU portion of the LLR register).
2. On "texel request" (one or more per pixel), a "hit" test is performed and:
   a. if a "miss", the line should be chosen for replacement according to step 5 below; the texture tile should be fetched; and the bits of the LLR register should be reset for this line according to 1.a. above.
   b. for either a "hit" or "miss", set current=1
      i. if the texture request is originated for the right-most pixel of the segment, set right=1.
      ii. if the texture request is originated for the bottom-most pixel of the segment, set bottom=1.
   c. for either a "hit" or "miss", update the age in the LLR register cache lines of the corresponding set in a conventional manner, such as by examining the lines and: if the age is smaller than the age of the line being used, increment by one; if the age is greater than the age of the line being used, no change is made; and set the age of the line being used to zero.
3. On "X-Move" (the signal indicating traverse move to next segment in the x-axis direction), for all LLR registers for all cache lines, set current=right and reset right=0.
4. On "Y-Move" (the signal indicating traverse move to next band in y-axis direction), for all LLR registers for all cache lines, set current=bottom and reset right=bottom=0.
5. Replacement process:
   a. Each time a new line needs to be fetched, a new line should be chosen as follows:
      i. First for all lines of the set, compute:
         LLR Rank=(1-right)*2*2*(number of cache lines in the set)+(1-current)*2*(number of cache lines in the set)+(1-bottom)*(number of cache lines in the set)+age Note: That LLR register value with current, right, and bottom bits inverted is the binary representation of the LLR Rank.

b. Replace line in the set which has the largest value.

Note: All the lines will have different values because the age term will be different. Right, current, and bottom can be equal for different lines and, if so, the process will default to the LRU process.

Thus, the above is a system which implements what the inventors describe as a LLR process with a default LRU process. This LLR process is generalized in that it can be used for increasing the efficiency of caches in most systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. Apparatus comprising:

a memory containing a plurality of texture tiles and an output having a plurality of pixels capable of being traversed in horizontal bands and vertical columns defining a plurality of segments; said output capable of having a primitive displayed thereon and a texture displayed on said primitive;

a cache containing a subset of said plurality of texture tiles;

a graphics processor connected to said cache and said memory, said processor using said texture tile to map said texture on said plurality of pixels on said output, said processor using a texture tile from said subset when a processor required texture tile is in said cache and from said plurality of texture tiles in said memory when said processor required texture tile is not in said cache;

a plurality of registers in said cache, each of said registers associated with each of said plurality of texture tiles in said subset of said plurality of texture tiles in said cache, said register having an entry recording when a texture tile in a first segment is in a spatial position to be reused in a second traverse; and said graphics processor replaces a texture tile in said cache using said entries in said register when said processor uses a texture tile from said memory with said texture tile from said memory based on replacing the least likely texture tile to be reused of said texture tiles in said cache.

2. The apparatus as claimed in claim 1 wherein:

each of said registers has selected entries therein updated where the texture tile required is in said cache and where the texture tile required is not in the texture cache.

3. The apparatus as claimed in claim 1 wherein:
each of said registers has at least one entry for recording information selected from a group consisting of:
when said texture tile is being used by a current segment;
when said texture tile touches the right edge of a current segment;
when said texture tile touches the bottom traverse line of the last band;
when said texture tile was last accessed; and
a combination thereof.

4. The apparatus as claimed in claim 1 wherein:
each of said registers have said entries reset when a texture tile in a first segment is in a spatial position to be reused in a second traverse, said entries form a number; and
said processor compares said numbers in said registers for each of said plurality of texture tiles in said cache with each other to determine the texture tile to be replaced.

5. The apparatus as claimed in claim 1 wherein:
each of said registers have said entries form the first portion of a number, said entries are changed when a texture tile in a first segment is in a spatial position to be reused in a second traverse; and
said entries in said registers form the second portion of said number, said entries are changed when a texture tile is used by said processor; and
said processor compares said numbers in said registers for each of said plurality of texture tiles in said cache with each other to determine the texture tile to be replaced.

6. The apparatus as claimed in claim 1 wherein:
said cache is set-associative and said subset of said plurality of texture tiles contains a plurality of sets; and
said registers are associated with each of said plurality of sets.

7. A cache texture tile replacement method comprising the steps of:
traversing an output in a memory having a plurality of pixels in horizontal bands and vertical columns defining a plurality of segments;
displaying a primitive on said output and a texture on said primitive;
placing a plurality of texture tiles in a memory;
placing a subset of said plurality of texture tiles in a cache;
using said texture tile to map texture on to said plurality of pixels on said output with a graphics processor connected to said cache and said memory;
using a texture tile from said subset when a processor required texture tile is in said cache;
using a texture tile from said plurality of texture tiles in said memory when said processor required texture tile is not in said cache;
recording an entry in a register associated with each of said plurality of texture tiles in said subset of said plurality of texture tiles in said cache when a texture tile in a first segment is in a spatial position to be reused in a second traverse; and
replacing the least likely texture tile to be reused of said texture tiles in said cache using said entries in said register when said processor uses a texture tile from said memory to replace said texture tile in said cache.

8. The cache texture tile replacement method as claimed in claim 7 including the step of:
recording information in an entry for each of said registers selected from a group consisting of if:
said texture tile is being used by a current segment;
said texture tile touches the right edge of a current segment;
said texture tile touches the bottom traverse line of the last band;
said texture tile was last accessed; and
a combination thereof.

9. The cache texture tile replacement method as claimed in claim 7 including the steps of:
resetting said entries in said registers when a texture tile in a first segment is in a spatial position to be reused in a second traverse;
forming said entries into a number;
comparing said numbers in said registers for each of said plurality of texture tiles in said cache with each other; and
replacing said texture tile in said cache with said texture tile from said memory as a result of said comparing step.

10. The cache texture tile replacement method as claimed in claim 7 including the steps of:
forming a first portion of a number in said registers,
resetting said entries when a texture tile in a first segment is in a spatial position to be reused in a second traverse; and
forming the second portion of said number in said entries in said registers;
resetting said entries when a texture tile is used by said processor; and
comparing said numbers in said registers for each of said plurality of texture tiles in said cache with each other to determine the texture tile to be replaced.

11. The cache texture tile replacement method as claimed in claim 7 including the steps of:
making said cache set-associative;
placing said subset of said plurality of texture tiles in said cache which contains a plurality of sets; and
associating said registers with each of said plurality of sets.

* * * * *